United States Patent [19]
Suzuki

[11] Patent Number: 5,839,421
[45] Date of Patent: Nov. 24, 1998

[54] EVAPORATION GAS INTERCEPTING SYSTEM FOR AUTOMOTIVE VEHICLE

[75] Inventor: Yasufumi Suzuki, Gunma-ken, Japan

[73] Assignee: Fuji Jukogyo Kabushiki Kaisha, Tokyo, Japan

[21] Appl. No.: 786,448

[22] Filed: Jan. 21, 1997

[30] Foreign Application Priority Data

Jan. 24, 1996 [JP] Japan .................................. 8-010277

[51] Int. Cl.⁶ .................................................. F02D 41/00
[52] U.S. Cl. .......................................................... 123/698
[58] Field of Search .................................. 123/698, 699, 123/674, 399, 519, 520

[56] References Cited

U.S. PATENT DOCUMENTS

| | | | |
|---|---|---|---|
| 5,657,737 | 8/1997 | Ishida et al. | 123/674 |
| 5,682,869 | 11/1997 | Nankee, II et al. | 123/698 |
| 5,694,911 | 12/1997 | Kawamoto et al. | 123/674 |
| 5,699,778 | 12/1997 | Muraguchi et al. | 123/698 |

Primary Examiner—Raymond A. Nelli
Attorney, Agent, or Firm—Beveridge, DeGrandi, Weilacher & Young, L.L.P.

[57] ABSTRACT

An evaporation gas intercepting system prevents the entrance of an evaporation gas leaked from a canister into a passenger compartment of a vehicle with an air conditioning system in which an outside air intake or inside air circulation is selected. An engine control unit calculates a fuel injection quantity on the basis of parameters indicating the operating condition of an engine and correction coefficients, and a feedback correction quantity for correcting the fuel injection quantity on the basis of the output signal of an air-fuel ratio detector (oxygen sensor). If an excessive quantity of the evaporation gas is supplied to the engine such that the fuel injection quantity cannot properly be corrected by the feedback correction quantity, and the engine control unit carries out an evaporation correcting operation by using an evaporation correction, an air conditioning system control unit sets the automotive air conditioning system forcibly for an inside air circulation mode to prevent the entrance of the evaporation gas bearing a fuel odor and leaked from the canister into the passenger compartment.

4 Claims, 7 Drawing Sheets

EVAPORATION GAS INTERCEPTING SYSTEM FOR AUTOMOTIVE VEHICLE

BACKGROUND OF THE INVENTION

1. Field of the Invention

The present invention relates to an evaporation gas intercepting system for an automotive vehicle, capable of preventing an evaporation gas bearing a fuel odor from entering the passenger compartment of the vehicle.

2. Description of the Related Art

Generally, a vehicle is equipped with an automatic air conditioning system in which either outside air intake or inside air circulation is selected for comfortably air-conditioning a passenger compartment of the vehicle. The air conditioning system selects an outside air intake mode or an inside air circulation mode to create a pleasant environment in the passenger compartment. When the air conditioning system is set for the outside air intake mode, there is the possibility that the outside air bearing odors flows into the passenger compartment. If the outside air containing even a small amount of a highly diffusive substance, such as fuel, is supplied into the passenger compartment, the comfortableness of the internal environment of the vehicle is spoiled greatly.

Therefore, the vehicle is provided with a charcoal canister to trap an evaporation gas containing evaporated fuel emitted from a fuel tank and to feed the trapped evaporation gas to the engine for controlling evaporative emission. The charcoal canister has a container filled with activated charcoal that traps the evaporation gas, hence, fuel odor. The charcoal canister emits only clean air obtained by eliminating odorous substances from the outside air through a fresh air inlet or a drain to prevent the diffusion of the evaporation gas in the atmosphere.

According to a report about the performance of air conditioning systems, there are instances that outside air bearing a fuel odor is supplied into the passenger compartment and spoils the environmental conditions of the passenger compartment even in a vehicle provided with a canister controller for controlling such a charcoal canister, when the air conditioning system is operated in the outside air intake mode after the vehicle has been parked for a long time, especially in a hot environment. It is inferred that such a problem is due to the generation of a large amount of evaporation gas exceeding the gas adsorbing ability of the canister in the fuel tank, and due to leakage of the evaporation gas bearing a fuel odor and not trapped by the canister from the inlet or the drain of the canister.

An air conditioning system disclosed in JP-U No. 6-27227 is provided with (a) an arrangement in which the drain port of a canister opens into a frame member of a vehicle body not to allow an evaporation gas to leak into the engine compartment, (b) an arrangement in which the gas concentration of air is measured by a gas sensor disposed near the drain port or the air inlet of the canister and sets the air conditioner for an outside air intake mode or an inside air circulation mode according to the measured gas concentration to intercept entrance of outside air bearing a fuel odor into the passenger compartment, and (c) an arrangement in which the pressure of the evaporation gas in a fuel tank (actually, the internal pressure of the fuel tank) is measured by a pressure sensor disposed in the fuel tank, and in which a selector damper operates to set the air conditioning system for an inside air circulation mode to prevent the entrance of outside air bearing a fuel odor into the passenger compartment when the pressure of the evaporation gas is higher than a predetermined pressure and the traveling speed of the vehicle is lower than a predetermined value.

The arrangement of (a) needs a complicated structure, has a difficulty in sealing the frame member, and is unable to prevent perfectly the entrance of the evaporation gas into the passenger compartment. The arrangement of (b) is able to detect the evaporation gas by a gas sensor with a time lag after some evaporation gas has flowed past the outside air inlet, and needs an additional, expensive electric circuit for processing the output of the gas sensor. The arrangement of (c) needs an expensive, highly sensitive pressure sensor to detect a pressure rise resulting from the evaporation of the fuel in case of low internal pressure of the fuel tank.

SUMMARY OF THE INVENTION

Accordingly, it is a principal object of the present invention to provide an evaporation gas intercepting system for an automotive vehicle, capable of intercepting the entrance of an evaporation gas leaked from a canister and bearing a fuel odor into the passenger compartment of the vehicle.

According to the present invention, the evaporation gas intercepting system for an automotive vehicle has an air conditioning system for a passenger compartment of the vehicle, operable in an inside air circulation mode or in an outside air intake mode, an engine mounted on the vehicle for driving the vehicle, an engine speed sensor for detecting engine speed and for generating an engine speed signal, an air flow meter in an air intake pipe for measuring a quantity of an intake air flow into a cylinder of the engine and for producing a load signal, fuel injection quantity calculating means responsive to said engine speed signal and said load signal for calculating a basic fuel injection quantity and for generating a basic fuel quantity signal, and air-fuel ratio detecting means for outputting an air-fuel ratio signal, and the intercepting system comprises: air-fuel ratio correction means responsive to said air-fuel ratio signal for calculating a feedback correction quantity to correct said basic fuel injection quantity and for outputting an air-fuel ratio correction signal; air-fuel ratio learning control means responsive to said basic fuel quantity signal and said air-fuel ratio correction signal for deriving an air-fuel ratio learning control value at a starting time of an evaporation correction and for generating an air-fuel ratio learning correction signal; purge setting means responsive to said engine speed signal and said basic fuel quantity signal for deriving a purge duty ratio dependent on vehicle driving conditions and for producing a purge duty ratio signal; evaporation setting means responsive to said air-fuel ratio correction signal, said air-fuel ratio learning correction signal and said purge duty ratio signal for carrying out an evaporation correction of said fuel injection quantity to determine a corrected fuel injection quantity and for producing an evaporation correction signal; and control means response to said evaporation correction signal for changing over said air conditioning system to said inside air circulation mode when said evaporation correction signal is produced so as to prevent a fuel odor form entering said passenger compartment.

The evaporation gas intercepting system may set the air conditioning system for the inside air circulation mode when the calculated feedback correction quantity is equal to or greater than a predetermined value.

The engine control unit calculates the basic fuel injection quantity on the basis of the engine speed and engine load. The fuel injector injects the fuel at the basic fuel injection quantity after the feedback correction quantity for correcting the basic fuel injection quantity is calculated on the basis of the output of the air-fuel ratio sensor. The evaporation correction is calculated and the basic fuel injection quantity is corrected by the calculated evaporation correction to determine a fuel injection quantity at which the fuel injector injects the fuel when a large amount of the evaporation gas is fed to the engine from the canister and the feedback correction is unable to correct the basic fuel injection quantity properly. When the evaporation correction is carried out, the evaporation gas intercepting system sets the air conditioning system to the inside air circulation mode to intercept the entrance of the evaporation gas bearing a fuel odor and leaked from the canister into the passenger compartment.

The entrance of the evaporation gas leaked from the canister into the passenger compartment may be intercepted by making the evaporation gas intercepting system set the air conditioning system to the inside air circulation mode when the feedback correction quantity is equal to or greater than the predetermined value.

BRIEF DESCRIPTION OF THE DRAWINGS

Preferred embodiments of the present invention will become understood from the following detailed description by referring to the accompanying drawings, in which.

DETAILED DESCRIPTION OF THE PREFERRED EMBODIMENTS

A first embodiment of the present invention will be described with reference to FIGS. 1 to 6. An engine 1 for a vehicle will first be described with reference to FIG. 1 prior to the description of the invention.

Figure 1:
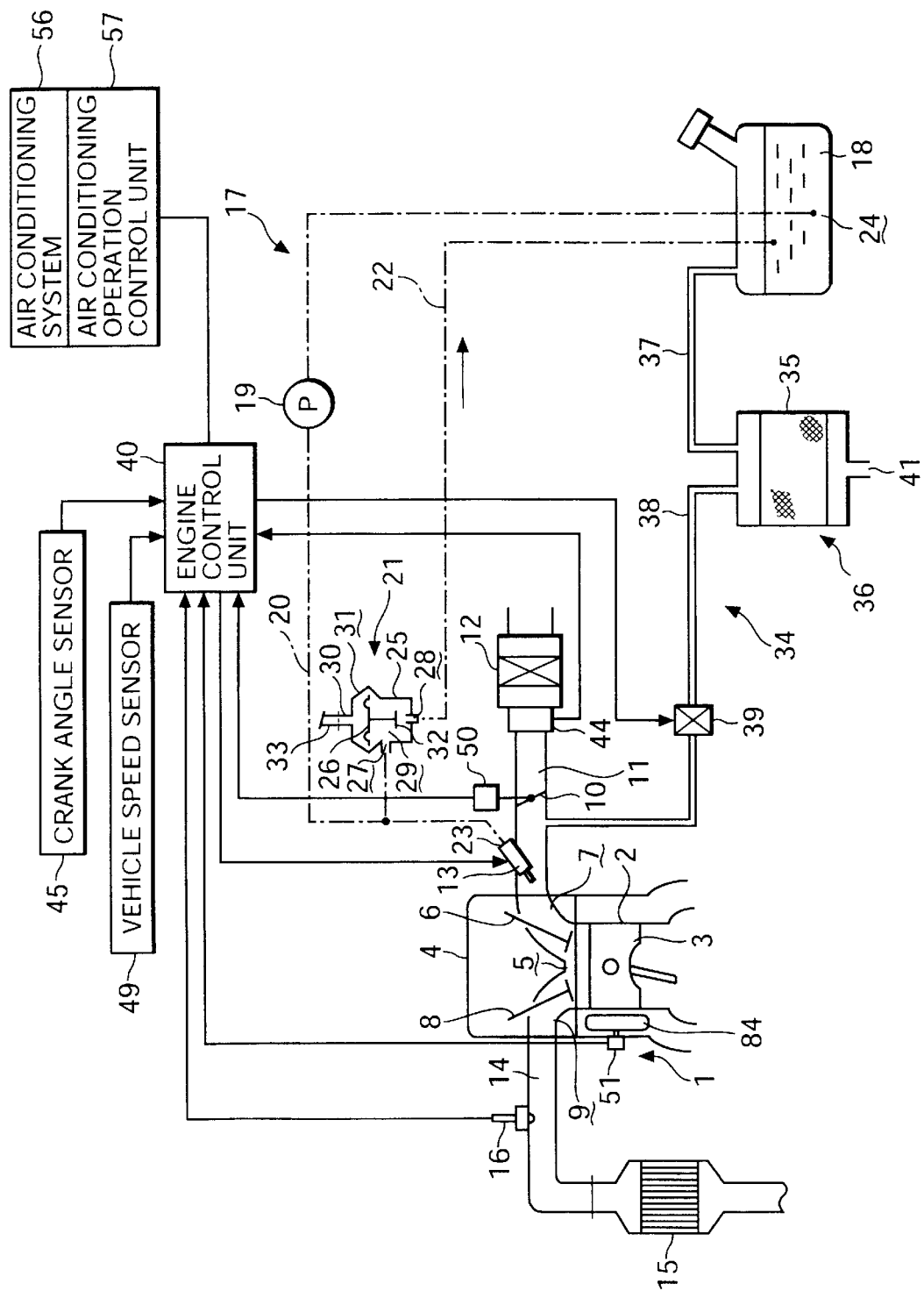
FIG. 1 is a block diagram of an evaporation gas intercepting system included in an automotive vehicle, according to a first embodiment of the present invention.

Referring to FIG. 1, the engine 1 has a cylinder or cylinders 2, and a piston 3 is fitted in the cylinder 2 for axial movement in the cylinder 2. An inlet port 7 provided with an inlet valve 6 and an exhaust port 9 provided with an exhaust valve 8 communicate with a combustion chamber 5 defined by the inner surface of the cylinder 2, the top surface of the piston 3 and the inner surface of a cylinder head 4. An air cleaner 12 is connected to the inlet port 7 via an intake pipe 11, and a throttle valve 10 is disposed in the intake pipe 11. An injector 13 is disposed in the intake pipe 11 at a position upstream of the inlet port 7 to eject fuel toward the inlet port 7. An exhaust pipe 14 is connected to the exhaust port 9. A catalytic converter 15 is disposed in the exhaust pipe 14, and an oxygen sensor 16, i.e., an air-fuel ratio detecting means, is disposed in the exhaust pipe 14 at a position upstream of the catalytic converter 15.

A fuel feed system 17 for supplying the fuel to the injector 13 includes, as principal components, a fuel tank 18 for storing the fuel, a fuel pump 19 for pumping up the fuel from the fuel tank 18, a fuel feed line 20 having one end connected to the fuel pump 19 and the other end connected to the injector 13 to feed the fuel discharged from the fuel pump 19 to the injector 13, a fuel pressure regulator 21 for regulating the fuel pressure in the fuel feed line 20 at a predetermined pressure, and a return line 22 for returning the fuel from the fuel pressure regulator 21 to the fuel tank 18.

One end of the fuel feed line 20 is connected to the fuel inlet 23 of the injector 13, and the other end of the same is inserted deep in the fuel tank 18. The fuel pump 19 is disposed in the fuel feed line 20. If the fuel pump 19 is a submerged pump, the fuel pump 19 is set on the bottom of the fuel tank 18 and the discharge port of the fuel pump 19 is connected to a suction opening 24 of the fuel feed line 20.

The fuel pressure regulator 21 is a vacuum type pressure regulator having a case 25 provided with a fuel inlet port 27, a fuel discharge port 28 and a pressure port 30 to which the internal pressure of the intake pipe 11 is applied, a diaphragm 26 partitioning the interior of the case 25 into two chambers, i.e., a fuel pressure chamber 29 to which fuel pressure is applied through the fuel inlet port 27 and a pressure chamber 31 to which the internal pressure of the intake pipe 11 is applied through the pressure port 30, a return spring, not shown, placed in the pressure chamber 31 to bias the diaphragm 26 toward the fuel pressure chamber 29, and a valve element 32 disposed in the fuel pressure chamber 29 and attached to the diaphragm 26 to open and close the discharge port 28. The fuel inlet port 27 is connected to the fuel feed line 20 at a position downstream from the fuel pump 19, and the discharge port 28 is connected through the return line 22 to the fuel tank 18. Further the pressure port 30 is connected through a pressure line 33 to the intake pipe 11 at a position downstream of the throttle valve 10.

A canister system 34 comprises a canister 36 formed by packing a cylindrical case 35 with layers of activated carbon that adsorbs and traps an evaporation gas, and a first purge line 37 connecting the interior of the case 35 of the canister 36 to the fuel tank 18 to supply the evaporation gas produced in the fuel tank 18 into the case 35. The canister system 34 further comprises a second purge line 38 connecting the interior of the case 35 to a portion of the intake pipe 11 downstream of the throttle valve 10 to feed the evaporation gas adsorbed by the activated carbon through the intake pipe 11 and the inlet port 7 into the combustion chamber 5 of the engine 1, a purging duty solenoid valve 39 disposed in the second purge line 38, and an engine control unit 40 which controls the purging solenoid valve 39 between a fully open state and a fully closed state, and controls the injector 13.

The purging duty solenoid valve 39 is controlled by an engine control unit 40 in a duty control mode. The purging duty solenoid valve 39 is fully closed to make the activated carbon of the canister 36 to adsorb the evaporation gas produced in the fuel tank 18. The purging duty solenoid valve 39 is fully opened to apply an intake vacuum prevailing in the intake pipe 11 to the evaporation gas adsorbed by the activated carbon so that the evaporation gas is sucked together with fresh air sucked through a fresh air inlet 41 formed in the case 35 of the canister 36 into the intake pipe 11.

Figure 2:
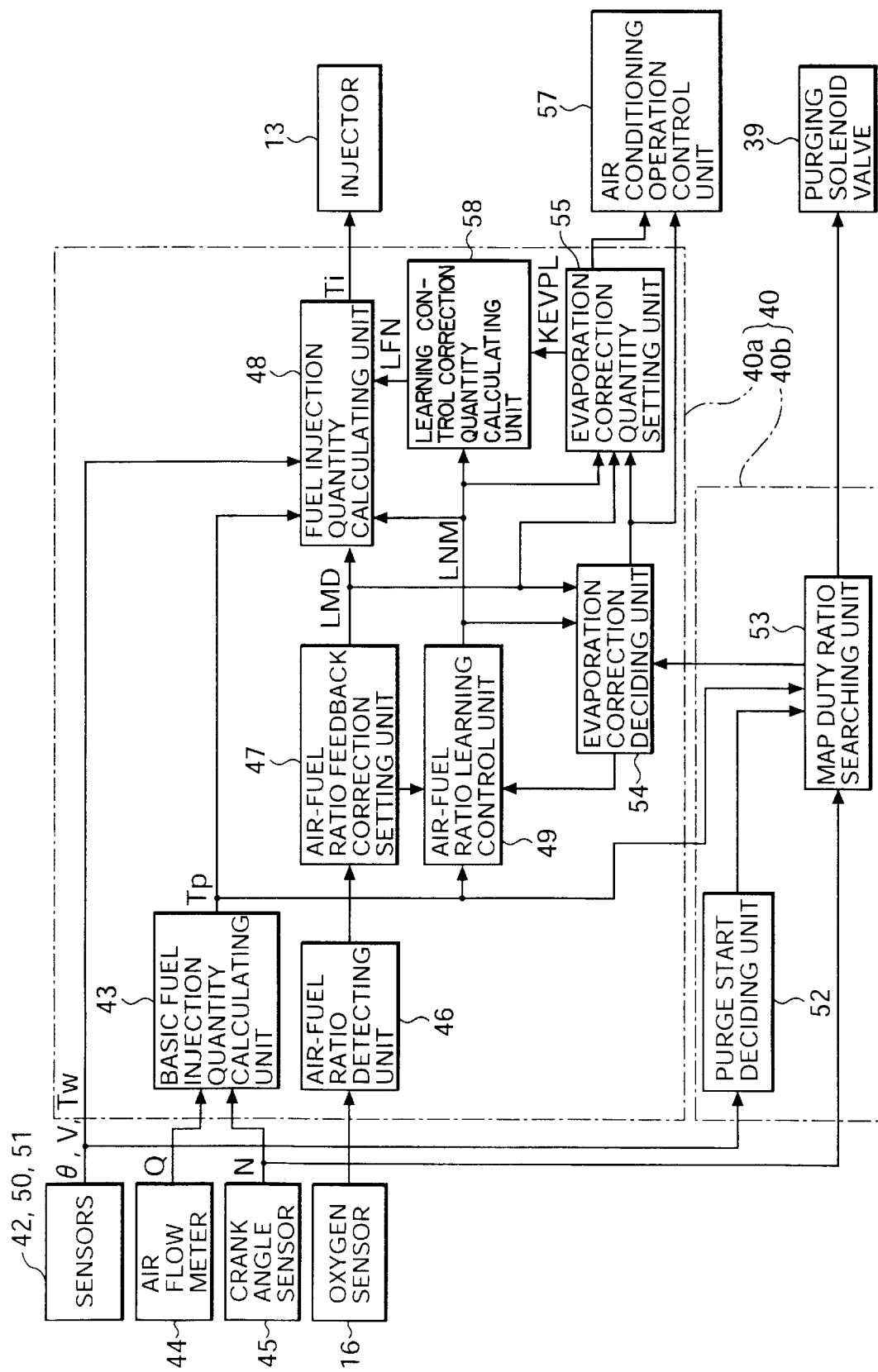
FIG. 2 is a block diagram of an engine control unit included in the evaporation gas intercepting system of FIG. 1.

The engine control unit 40 will be described below with reference to FIGS. 1 and 2. As shown in FIG. 2, the engine control unit 40 has a fuel injection control system 40a and a canister purge control system 40b. In the fuel injection control system 42a, a basic fuel injection quantity calculating unit 43 calculates a basic fuel injection pulse width (basic fuel injection quantity) Tp by using Tp=K×(Q/N), where K is an injector characteristic correction constant, Q is an intake air quantity represented by an output signal of an air flowmeter 44, i.e., an intake air flow sensor, and N is an engine speed represented by an output signal of a crank angle sensor 45, and an air-fuel ratio detecting unit 46 decides whether the air-fuel ratio of the air-fuel mixture is higher or lower than a stoichiometric air-/fuel ratio, i.e., whether the air-fuel mixture is lean or rich, on the basis of an output signal of the oxygen sensor 16, and gives a decision signal to an air-fuel ratio feedback correction setting unit 47.

The air-fuel ratio feedback correction setting unit 47 provides an air-fuel ratio feedback correction quantity LMD for increasing the air-fuel ratio to a fuel injection quantity calculating unit 48 when the air-fuel mixture is fuel-rich or provides an air-fuel ratio feedback correction quantity LMD for decreasing the air-fuel ratio to the fuel injection quantity calculating unit 48 when the air-fuel mixture is fuel-lean. An air-fuel ratio learning control unit 49 learns and stores a learned air-fuel ratio LNM of a correction quantity for correcting the basic fuel injection pulse width Tp on the basis of the basic fuel injection pulse width Tp and the air-fuel ratio feedback correction quantity LMD to improve the accuracy of air-fuel ratio feedback control. The learned air-fuel ratio LNM is added to the basic fuel injection pulse width Tp several pulses later to reduce the number of correction cycles for air-fuel ratio feedback control by the air-fuel ratio feedback correction setting unit 47.

The fuel injection quantity calculating unit 48 determines a correction quantity km corresponding to an operating condition of the engine from a vehicle speed V measured by a vehicle speed sensor 42, a throttle opening degree θ measured by a throttle sensor 50, and a coolant temperature Tw measured by a water temperature sensor 51. The calculting unit 48 calculates a fuel injection pulse width Ti corresponding to a fuel injection quantity on the basis of the correction quantity km, the basic fuel injection pulse width Tp, the air-fuel ratio feedback correction LMD and the learned air-fuel ratio LNM. The fuel injection pulse width Ti, and gives an fuel injection pulse width signal representing the fuel injection pulse width Ti to an injector driver, not shown, for driving the injector 13.

In the canister purge control system 40b, a purge start deciding unit 52 decides whether the engine 1 is in a warming-up state or in a normal operating state from the vehicle speed V, the throttle opening degree θ and the coolant temperature Tw. If the engine 1 has been warmed up, and the vehicle is traveling with the throttle opening θ being equal to or greater than a predetermined throttle opening degree, the purge start deciding unit 52 gives a purge start signal requesting the start of an evaporation gas purging operation to a map duty ratio searching unit 53. Upon the reception of the purge start signal, the map duty ratio searching unit 53 selects from a map a purge duty signal corresponding to the basic fuel injection pulse width Tp and the engine speed N, and gives the purge duty signal to the purging solenoid valve 39 and to an evaporation correction deciding unit 54 while the engine 1 is in the normal operating state other than an idling state and a decelerating state.

The evaporation correction deciding unit 54 decides that a large quantity of the evaporation gas is purged and an evaporation correction is necessary if the air-fuel ratio feedback correction quantity LMD is equal to or greater than a threshold value EVPLMD0, and decides that the engine 1 is in the normal operating state if the air-fuel ratio feedback correction quantity LMD is smaller than the threshold value EVPLMDO. When the evaporation correction deciding unit 54 decides that the evaporation correction is necessary, the evaporation correction deciding unit 54 gives an evaporation correction decision signal requesting the evaporation correction to the air-fuel ratio learning control unit 49 of the fuel injection control system 40a, an evaporation correction quantity setting unit 55 and an air conditioning operation control unit 57 for controlling an automotive air conditioning system 56. The air-fuel ratio learning control control unit 49 continues a normal air-fuel ratio learning operation when the evaporation correction deciding signal is not provided, and stops the normal air-fuel ratio learning control operation when the evaporation correction deciding signal is provided.

Figure 3:
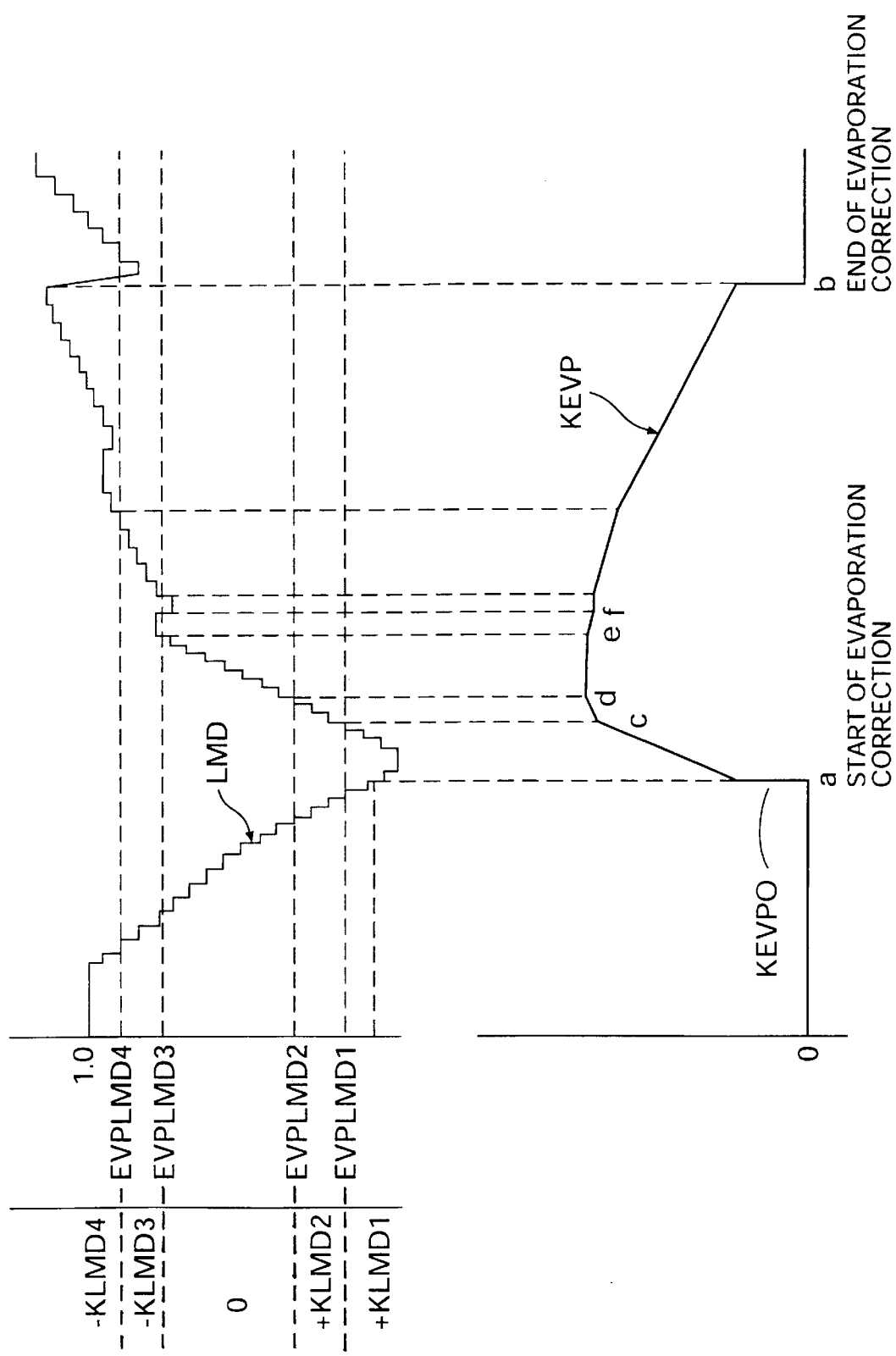
FIG. 3 is a diagram showing variation of evaporation correction coefficient KEVP with variation of air-fuel ratio feedback correction quantity LMD.

Referring to FIG. 3, the evaporation correction quantity setting unit 55 sets an initial set evaporation correction quantity KEVPO and starts an evaporation correcting operation when it is decided that evaporation correction is necessary. And then, the air-fuel ratio feedback correction quantity LMD becomes more fuel-lean. At that time, the evaporation correction coefficient KEVP is calculated by the following equation for each region demarcated by control values EVPLMD1, EVPLMD2, EVPLMD3 and EVPLMD4, which are set on the basis of the air-fuel feedback correction quantity LMD:

$$KEVP = Kn + KLMD$$

where

Kn: A value of the evaporation correction coefficient KEVP used in the preceeding correction cycle KLMD (+KLMD1, +KLMD2, −KLMD3, −KLMD4): Predetermined constants calculated for each region The sequentially calculated evaporation correction coefficients KEVP are multiplied by the learned evaporation correction LEVP set during the evaporation correcting operation to obtain evaporation correction quantities KEVPL, and the evaporation correction quantities KEVPL are given to a learning correction calculating unit 58.

The learning control correction calculating unit 58 subtracts the evaporation correction KEVPL from a learning control air-fuel LNM at the start of the evaporation correcting operation to obtain a learning control correction quantity LFN (LFN=LNM−KEVPL), and the learning control correction quantity LFN is given instead of the learning control air-fuel ratio LNM to the fuel injection quantity calculating unit 48. Therefore, the fuel injection quantity calculating unit 48 calculates the fuel injection pulse width Ti on the basis of the correction quantity km, the basic fuel injection pulse width Tp, the air-fuel ratio feedback correction quantity LMD and the learning control correction quantity LFN during the evaporation correcting operation, and the calculating unit 48 gives a fuel injection pulse width signal representing the fuel injection pulse width Ti to the injector driver for driving the injector 13 to adjust the air-fuel ratio quickly to the stoichiometric air-fuel ratio.

The engine control unit 40 determines whether or not a large amount evaporation gas purging is in process on the basis of the output of the oxygen sensor 16. The engine control unit 40 executes an air-fuel ratio feedback control operation to adjust the air-fuel ratio to the stoichiometric air-fuel ratio when a large amount evaporation gas purging is not in process. The control unit 40 executes an evaporation correcting control operation to prevent the deterioration of combustion that occurs during the large amount purging when such large amount evaporation gas purging is in process and the air-fuel ratio feedback control operation is unable to correct the air-fuel ratio.

Figure 4:
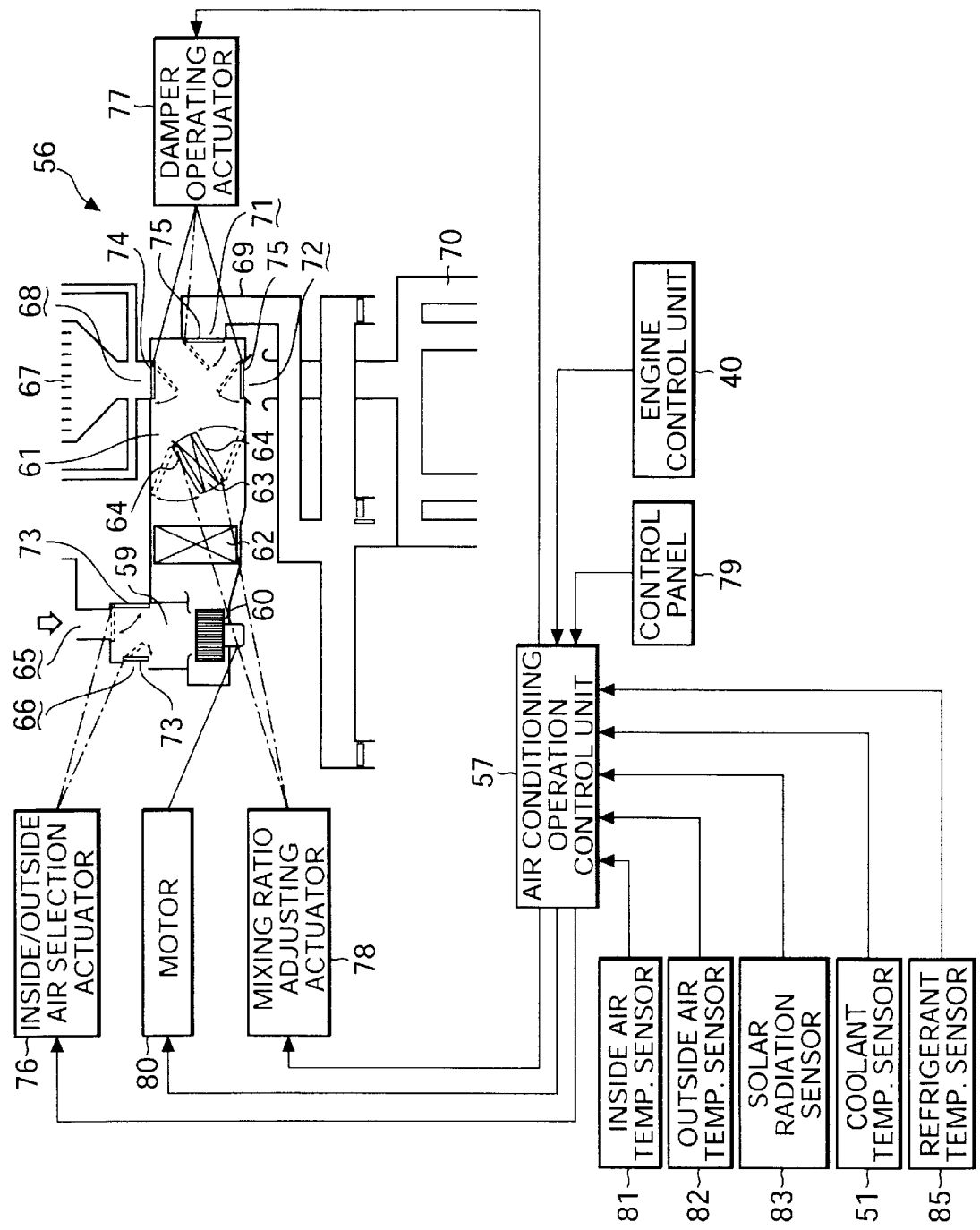
FIG. 4 is a block diagram of the automotive air conditioning system and an air conditioning operation control unit.

The air conditioning system 56 and the air conditioning operation control unit 57, i.e., an outside air intake and inside air circulation select controller, will be described with reference to FIG. 4.

The air conditioning system 56 is of a well-known automatic type having an engine compartment duct 59 for selectively taking in either the outside air or the inside air (air in the passenger compartment), a compartment duct 61 connected to the engine compartment duct 59, a fan 60 placed in the compartment duct 61, an evaporator 62 disposed in an upstream portion of the compartment duct 61, a heater core 63 disposed downstream of the evaporator 62, a mixing ratio adjusting door 64 disposed in combination with the heater core 63 to regulate the temperature of the air to be induced into the passenger compartment, and an automatic system, which is operated by the refrigerating cycle, not shown, comprising a compressor, a condenser, a receiver tank, an expansion valve and the evaporator 62.

The engine compartment duct 59 has an outside air inlet 65 opening into the engine compartment, and an inside air inlet 66 opening into the passenger compartment. The compartment duct 61 is provided with a defroster opening 68 connected to a defroster 67, and air supply openings 71 and 72 connected, respectively, to air distribution ducts 69 and 70 having branches to distribute the air in the passenger compartment. The outside air inlet 65, the inside air inlet 66, the defroster opening 68 and the air supply openings 71 and 72 can be opened and closed by dampers, respectively.

A pair of inside/outside air select dampers 73 are disposed such that the outside air inlet 65 is open when the inside air inlet 66 is closed, and the outside air inlet 65 is closed when the inside air inlet 66 is open to establish either the inside air circulation mode or the outside air intake mode. The defroster opening 68 is opened and closed by a damper 74, and the air supply openings 71 and 72 are opened and closed by dampers 75. The inside/outside air select dampers 73 are operated by an inside/outside air select actuator 76, and the dampers 74 and 75 are operated by an actuator 77. The mixing ratio adjusting door 64 is operated by a mixing ratio adjusting actuator 78. The outside air is supplied into the passenger compartment for an air-conditioning operation in the outside air intake mode if the inside/outside air select dampers 73 are set at an outside air intake position by the inside/outside air select actuator 76. The inside air is circulated through the passenger compartment and the air conditioning system for an air-conditioning operation in the inside air circulation mode if the inside/outside air select dampers 73 are set at an inside air circulation position.

The air conditioning operation control unit 57 determines a general control signal t on the basis of factors representing loads on the air-conditioning of the passenger compartment including the temperature of the passenger compartment, the temperature of the outside air, the amount of incident solar radiation (sun light), the temperature of the refrigerant at the exit of the evaporator 62, the temperature of coolant for cooling the engine 1, and output signals provided by a control panel 79 operated by the passenger. The control unit 57 thus controls the actuators 76, 77 and 78, and a motor 80 for driving the fan 60 and a motor for driving the compressor on the basis of the general control signal t to air-condition the passenger compartment so as to meet conditions specified by the passenger. The general control signal t is calculated, for example, by using:

t=A×(Predetermined temperature)+B×(Inside air temperature)+C×(Outside air temperature)+D× (Amount of incident solar radiation)+E where, A, B, C, D and E are constants determined through the analysis of results of experimental operation of the air conditioning system.

In this embodiment, the control panel 79 is attached to an instrument panel, the temperature of the passenger compartment is measured by an inside air temperature sensor 81, the outside air temperature is measured by an outside air temperature sensor 82 attached to a bonnet fastener, the amount of incident solar radiation is measured by a solar radiation sensor 83, such as a photodiode, attached to, for example, an upper part of the instrument panel, The coolant temperature Tw is measured by the coolant temperature sensor 51 attached to the water jacket of the engine 1, and the temperature of the refrigerant at the exit of the evaporator 62 is measured by a refrigerant temperature sensor 85 disposed at the exit of the evaporator 62.

Upon the reception of an evaporation correction decision signal from the evaporation correction deciding unit 54 of the engine control unit 40, the air conditioning operation control unit 57 inhibits the operation of the actuator 76 for setting the dampers 73 at the position for the outside air intake mode according to the general control signal t, and gives a control signal to the actuator 76 to set the dampers 73 forcibly at the position for the inside air circulation mode when the air-fuel ratio feedback correction quantity LMD is equal to or greater than the predetermined threshold value. When the evaporation correction decision signal is stopped, i.e., when evaporation correction is canceled, and the air-fuel ratio feedback correction quantity LMD is less than the predetermined threshold value, the air conditioning operation control unit 57 resumes the control operation according to the general control signal t. The threshold value is a value corresponding to a state where a large amount of the evaporation gas is purged from the canister 36 into the engine 1 and air-fuel ratio cannot be corrected by using the air-fuel ratio correction quantity LMD. The threshold value is an empirical value determined on the basis of experimental data obtained through the analysis of the engine operation. Thus, the entrance of the evaporation gas bearing a fuel odor can be intercepted and a pleasant riding environment can be secured even if a large amount of the evaporation gas is purged from the canister 36 into the engine 1 and the air-fuel ratio cannot be corrected by using the air-fuel ratio feedback correction quantity LMD.

A description will be given of an air conditioning operation control procedure to be executed by the air conditioning operation control unit 57 to select either the inside air circulation mode or the outside air intake mode according to the evaporation correction decision signal with reference to a flow chart shown in FIG. 5.

Figure 5:
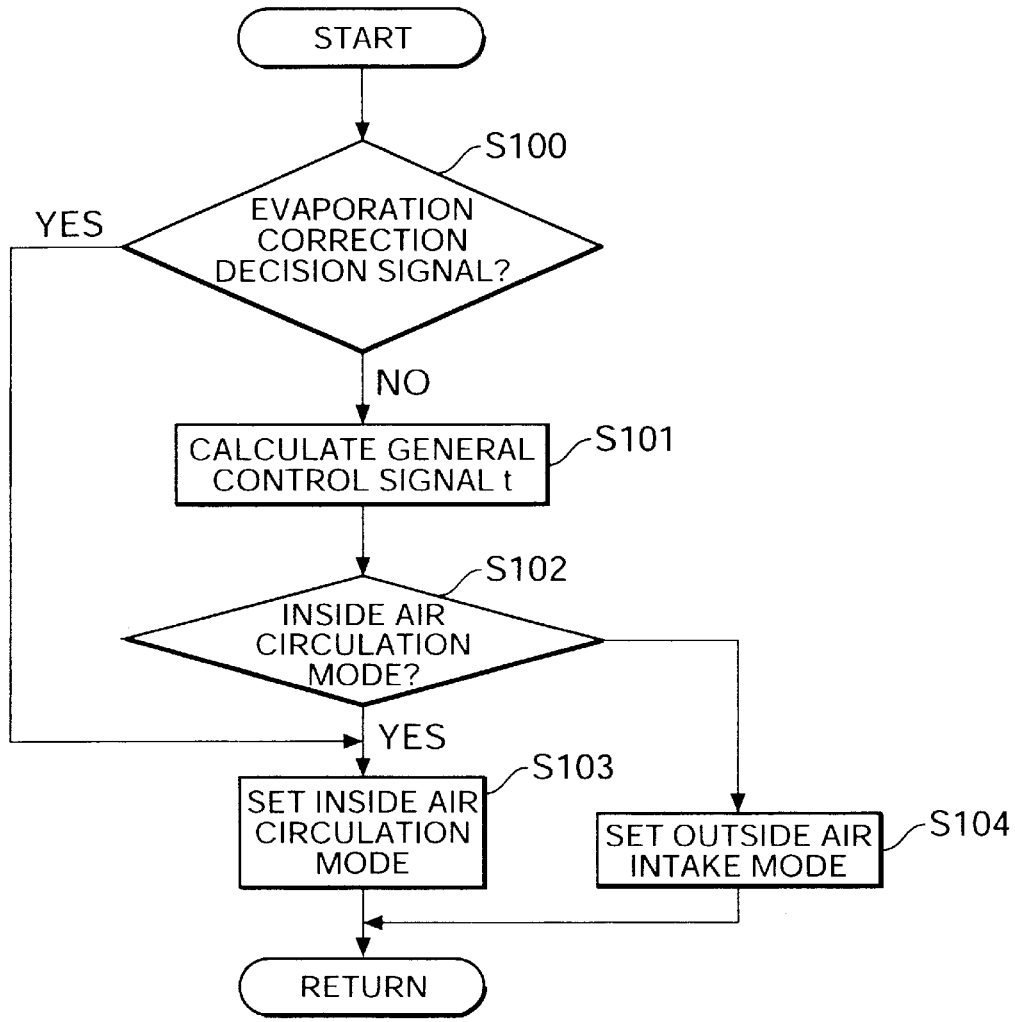
FIG. 5 is a flow chart of an air conditioning mode control procedure to be executed by the air conditioning operation control unit to select an inside air circulation mode or an outside air intake mode according to an evaporation correction decision signal.
Figure 6:
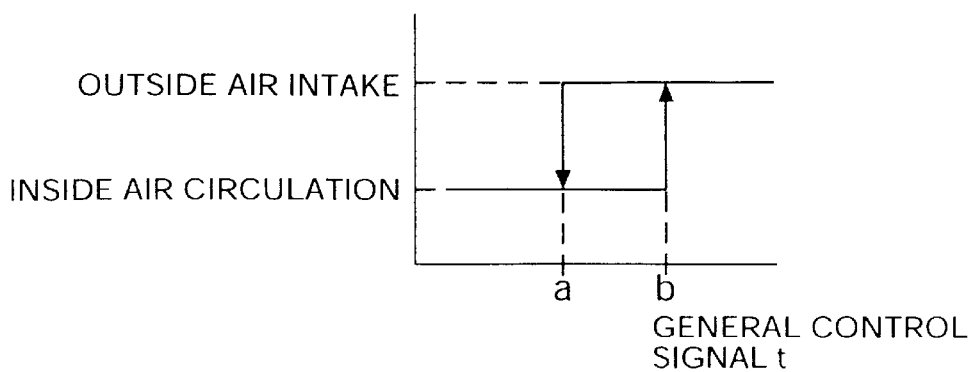
FIG. 6 is a diagram explaining the operation of the air conditioning mode control unit for changing the operating mode of the automotive air conditioning system.

Referring to FIG. 5, the air conditioning operation control unit 57 makes a query in the step S100 to see if an evaporation correction decision signal is given. When the response in the step S100 is affirmative, i.e., when the evaporation correction operation is necessary, the air conditioning operation control unit 57 sets the inside air circulation mode in the step S103. When the response in the step S100 is negative, i.e., when the evaporation correction decision signal is not given, the general control signal t is calculated in step S101. Then, a query is made in step S102 to see if the general control signal t specifies the inside air circulation mode. If the response in the step S102 is negative, i.e., if the air conditioning system is set for the inside air circulation mode and the general control signal t is equal to or greater than a predetermined value b (FIG. 6), the air conditioning operation control unit 57 sets the automotive air conditioning system for the outside air intake mode in step S104. If the response in the step S102 is affirmative, i.e., if the air conditioning system is set for the outside air intake mode and the general control signal t is smaller than a predetermined value a (FIG. 6), the air conditioning operation control unit 57 sets the air conditioning system for the inside air circulation mode in step S103.

An evaporation gas intercepting system according to a second embodiment of the present invention will be described with reference to FIGS. 7 and 8, in which parts like or corresponding to those of the first embodiment are designated by the same reference characters and the description thereof will be omitted.

Figure 7:
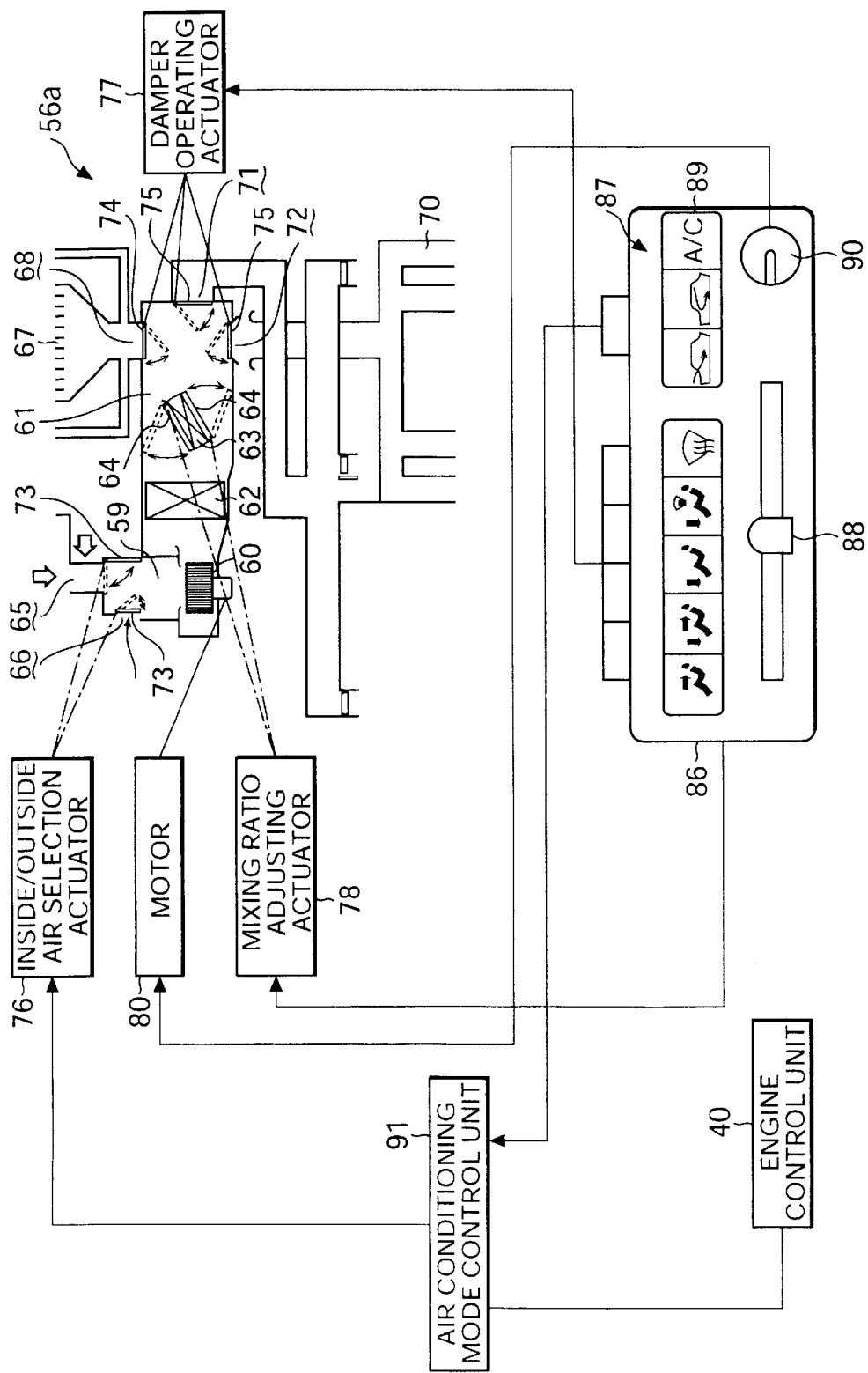
FIG. 7 is a block diagram of an evaporation gas intercepting system included in an automotive vehicle, according to a second embodiment of the present invention.

Referring to FIG. 7, a control panel 86 included in the evaporation gas intercepting system in the second embodiment is provided with an inside/outside air selection switch 87, a temperature setting lever 88, an air conditioner control switch 89, and a fan switch 90. An air conditioning mode control unit 91 operates the inside/outside selection actuator 76 according to a signal provided by operating the inside/outside air selection switch 87. In an air conditioning system 56a, the operating speed of a motor 80 for driving a fan 60, which determines the output of the fan 60, the operation of the inside/outside selection actuator 76 for setting the inside air circulation mode or the outside air intake mode, the operation of a mixing ratio adjusting actuator 78 for adjusting the position of a mixing ratio adjusting door 64, the operating speed of the drive motor for driving the compressor, which dominates the temperature of air induced into the passenger compartment, and the operation of a damper operating actuator 77 for positioning a damper are controlled according to signals provided by operating those switches and the lever to establish a desired air-conditioning condition. The air conditioning mode control unit 91 inhibits the operation of the actuator 76 according to a signal provided by operating the inside/outside air selection switch 87 for setting the dampers 73 at positions for the outside air intake mode, when an evaporation decision signal is provided by an evaporation correction deciding unit 54 (FIG. 2) and an evaporation correction quantity KEVPL based on the air-fuel ratio feedback correction quantity LMD is equal to or greater than a predetermined threshold value, and gives a damper setting signal to the actuator 76 to set the dampers 73 for the inside air circulation mode, in which the outside air inlet 65 is closed and the inside air inlet 66 is opened. The air conditioning mode control unit 91 allows the operation of the inside/outside air selection actuator 76 to set the dampers 73 for the outside air intake mode when any evaporation correction decision signal is not provided by the evaporation correction deciding unit 54 and the air-fuel ratio feedback correction quantity LMD is less than the predetermined threshold value.

Figure 8:
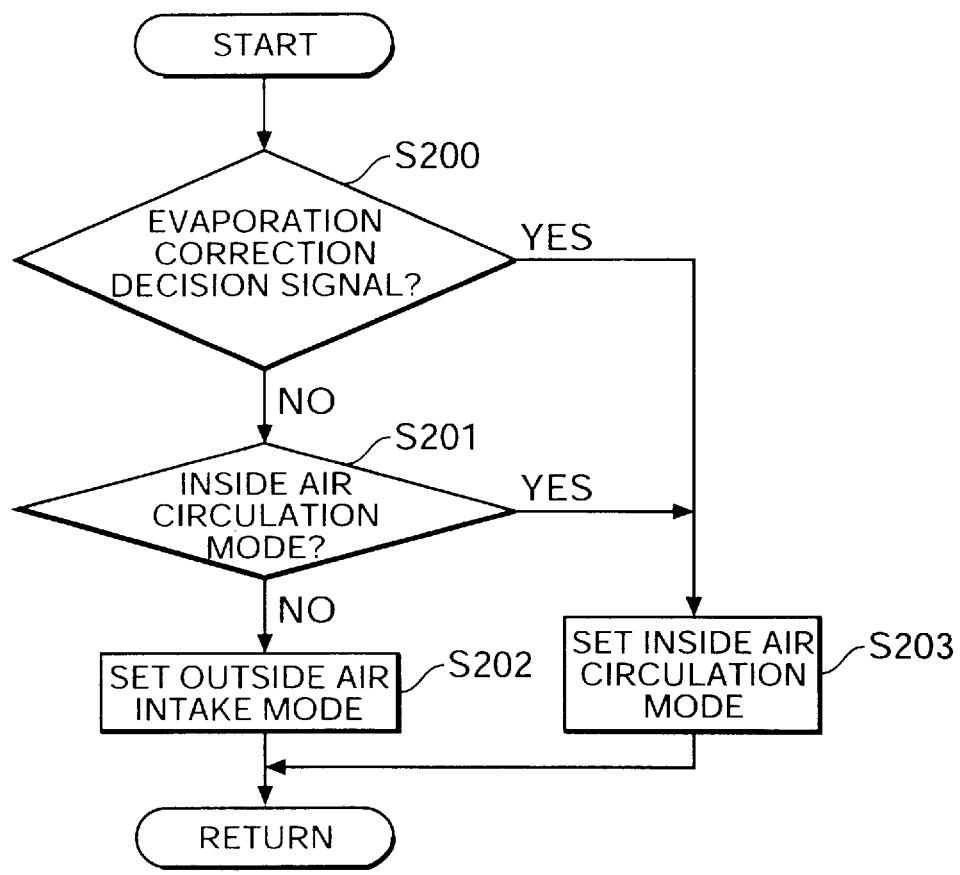
FIG. 8 is a flow chart of an air conditioning mode control procedure to be executed by an air conditioning operation control unit to change the operating mode of the automotive air conditioning system of FIG. 7.

FIG. 8 is a flow chart of an air conditioning mode control procedure by way of example to be executed by the air conditioning mode control unit 91 to change the operating mode of the air conditioning system of FIG. 7.

In step S200, a query is made to see if an evaporation correction decision signal has been given. If an evaporation correction decision signal has been given, the inside air circulation mode is selected regardless of other conditions, a control signal to set the dampers 73 at positions for the inside air circulation mode is given to the actuator 76 to close the outside air inlet 65 and to open the inside air inlet 66 in step S203 to prevent the entrance of the evaporation gas bearing a fuel odor and discharged from the canister through the fresh air inlet 41 into the passenger compartment. If the response in step S200 is negative, a query is made in step S201 to see if the inside/outside air selection switch 87 is operated for the inside air circulation mode. If the response in the step S201 is affirmative, step S203 is executed; a control signal to set the dampers 73 at positions for the inside air circulation mode is given to the actuator 76 to set the air conditioning system 56a for the inside air circulation mode. If the response in step S201 is negative, a control signal to set the dampers at positions for the outside air intake mode is given to the actuator 76 to set the air conditioning system 56a for the outside air intake mode.

The air conditioning system 56 combined with the first embodiment has been described as an air conditioning system of the automatic type. Generally, an air conditioning system of an automatic type is provided with an automatic/manual selector switch for selecting a manual operation mode or an automatic operation mode. The control procedure shown in FIG. 8 may be stored in the air conditioning system 56 of the automatic type to make the air conditioning system 56 to carry out the control procedure. Thus, the entrance of the evaporation gas into the passenger compartment can be intercepted both in the manual operation mode and the automatic operation mode.

The air conditioning operation control unit 57, i.e., an inside/outside air selection control means, operates to set the automotive air conditioning system 56 for the inside air circulation mode or the outside air intake mode according to the output signals of the sensors 51, 81, 82, 83 and 85 indicating the operating condition of the air conditioning system 56. And the control unit 57 inhibits the outside air intake operation of the automotive air conditioning system 56 according to the output signals of the sensors 51, 81, 82, 83 and 85 and sets the air conditioning system 56 to the inside air circulation mode when the engine control unit 40 is in the evaporation correction operation. Accordingly, even an inexpensive air conditioning system that automatically changes its operating mode according to the load thereon between an inside air circulation mode and an outside air intake mode is able to intercept the entrance of the evaporation gas bearing a fuel odor and leaked from the canister 36 into the passenger compartment.

The air conditioning operation control unit 57, i.e., the inside/outside air selection control means, operates to set the automotive air conditioning system 56 to the inside air circulation mode when the outside air intake mode is selected by operating the automatic/manual selector switch and the engine control unit 40 is in the evaporation correction operation. Therefore, even an inexpensive air conditioning system which can be set for the inside air circulation mode or the outside air intake mode by means of manually operated switches is able to intercept the entrance of the evaporation gas bearing a fuel odor and leaked from the canister 36 into the passenger compartment.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An evaporation gas intercepting system of an automotive vehicle having, an air conditioning system for a passenger compartment of the vehicle, operable in an inside air circulation mode or in an outside air intake mode, an engine mounted on the vehicle for driving the vehicle, an engine speed sensor for detecting engine speed and for generating an engine speed signal, an air flow meter in an air intake pipe for measuring a quantity of an intake air flow into a cylinder of the engine and for producing a load signal, fuel injection quantity calculating means responsive to said engine speed signal and said load signal for calculating a basic fuel injection quantity and for generating a basic fuel quantity signal, and air-fuel ratio detecting means for outputting an air-fuel ratio signal, said system comprising:

air-fuel ratio correction means responsive to said air-fuel ratio signal for calculating a feedback correction quantity to correct said basic fuel injection quantity and for outputting an air-fuel ratio correction signal;

air-fuel ratio learning control means responsive to said basic fuel quantity signal and said air-fuel ratio correction signal for deriving an air-fuel ratio learning control value at a starting time of an evaporation correction and for generating an air-fuel ratio learning correction signal;

purge setting means responsive to said engine speed signal and said basic fuel quantity signal for deriving a purge duty ratio dependent on vehicle driving conditions and for producing a purge duty ratio signal;

evaporation setting means responsive to said air-fuel ratio correction signal, said air-fuel ratio learning correction signal and said purge duty ratio signal for carrying out an evaporation correction of said fuel injection quantity to determine a corrected fuel injection quantity and for producing an evaporation correction signal; and control means responsive to said evaporation correction signal for changing over said air conditioning system to said inside air circulation mode when said evaporation correction signal is produced so as to prevent a fuel odor form entering said passenger compartment.

2. The evaporation gas intercepting system according to claim 1, wherein:

said evaporation setting means is operated to carry out the evaporation correction when said feedback correction quantityexceeds a predetermined value.

3. The evaporation gas intercepting system according to claim 1, wherein:

said control means comprises:

evaporation correction deciding means responsive to said feedback correction quantity for delivering an output signal when said feedback correction quantity exceeds a predetermined value; and air conditioning operation control means responsive to said output signal for operating said means for changing over to set the air conditioning system to said inside air circulation mode.

4. The evaporation gas intercepting system according to claim 3, further comprising:

fuel purge start deciding means for outputting a purge start signal;

map duty ratio searching means responsive to said purge start signal and driving conditions of the vehicle to supply a purge duty signal to said evaporation correction deciding means; and a purge solenoid valve responsive to said purge duty signal for opening to allow a fuel vapor purge through a canister system into a vehicle engine.

* * * * *